(12) United States Patent
Boyes (10) Patent No.: US 6,986,333 B2
(45) Date of Patent: Jan. 17, 2006

(54) INTAKE MANIFOLD WITH VARIABLE RUNNER AREA

(75) Inventor: Andrew Boyes, Aurora (CA)

(73) Assignee: Litens Automotive, Woodbridge (CA)

( * ) Notice: Subject to any disclaimer, the term of this patent is extended or adjusted under 35 U.S.C. 154(b) by 0 days.

(21) Appl. No.: 10/873,820

(22) Filed: Jun. 22, 2004

(65) Prior Publication Data
US 2005/0279313 A1  Dec. 22, 2005

Related U.S. Application Data

(63) Continuation-in-part of application No. 10/496,602, filed on May 25, 2004.

(51) Int. Cl.
F02M 35/10 (2006.01)

(52) U.S. Cl. ............... 123/184.21; 123/184.56
(58) Field of Classification Search ........... 123/184.21, 123/184.56
See application file for complete search history.

(56) References Cited

U.S. PATENT DOCUMENTS

| | | | |
|---|---|---|---|
| 871,320 A | 11/1907 | Bollee | |
| 1,397,482 A | 11/1921 | Bachle | |
| 2,894,497 A | 7/1959 | Bolles, Jr. | |
| 3,999,522 A | 12/1976 | Jaulmes | |
| 4,210,107 A | 7/1980 | Shaffer | |
| 4,274,368 A | 6/1981 | Shaffer | |
| 4,465,035 A | 8/1984 | Carr | |
| 4,590,895 A | 5/1986 | Yada et al. | |
| 4,805,573 A | 2/1989 | Macfarlane et al. | |
| 4,858,567 A * | 8/1989 | Knapp ................ | 123/184.56 |
| 4,862,840 A | 9/1989 | Matsunaga et al. | |
| 4,911,111 A | 3/1990 | Matsunaga et al. | |
| 4,928,638 A | 5/1990 | Overbeck | |
| 4,977,866 A | 12/1990 | Wilkins | |
| 5,216,985 A * | 6/1993 | Brummer et al. ...... | 123/184.56 |
| 5,311,848 A | 5/1994 | Isaka et al. | |
| 5,438,964 A | 8/1995 | Breidenbach | |
| 5,642,697 A | 7/1997 | Jahrens et al. | |
| 5,662,086 A | 9/1997 | Piccinini | |
| 5,687,684 A | 11/1997 | Verkleeren | |
| 5,722,358 A | 3/1998 | Fuesser et al. | |
| 5,749,342 A | 5/1998 | Chao | |
| 5,762,036 A | 6/1998 | Verkleeren | |
| 5,787,852 A | 8/1998 | Muramatsu et al. | |
| 5,797,365 A | 8/1998 | Kim | |
| 5,823,157 A | 10/1998 | Muramatsu | |
| 5,890,464 A | 4/1999 | Martinelli | |
| 5,947,072 A * | 9/1999 | Loy et al. ............. | 123/184.56 |
| 5,950,587 A | 9/1999 | Sattler et al. | |

(Continued)

FOREIGN PATENT DOCUMENTS

DE  3807159 A1 * 9/1989

*Primary Examiner*—Marguerite McMahon
(74) *Attorney, Agent, or Firm*—Clark Hill PLC (57) ABSTRACT

A tunable intake manifold extends between a plenum and an intake of an internal combustion engine. A manifold housing defines an interior and a runner wall extending through the interior. A slider extends through the interior and slidably engages the manifold housing. The slider defines a slider wall cooperative with the runner wall to form a runner for transporting air therethrough. The runner defines a cross section. A drive assembly is operatively coupled between the manifold housing and the slider to move the slider transversely along the manifold housing to change the defined cross section of the runner such that the volume of air passing therethrough changes with the movement of the slider.

15 Claims, 8 Drawing Sheets

U.S. PATENT DOCUMENTS

| | | |
|---|---|---|
| 6,105,545 A | 8/2000 | Breidenbach |
| 6,216,657 B1 | 4/2001 | Paffrath et al. |
| 6,289,864 B1 | 9/2001 | Vide et al. |
| 6,357,410 B1 | 3/2002 | Rutschmann |
| 6,367,440 B1 | 4/2002 | Husges |
| 6,431,136 B2 | 8/2002 | Pietrowski et al. |
| 6,568,366 B2 | 5/2003 | Dietz et al. |
| 6,591,804 B2 | 7/2003 | Matsumoto et al. |
| 6,591,805 B1 | 7/2003 | Karlsson et al. |
| 2001/0010213 A1 | 8/2001 | Umino et al. |
| 2002/0139340 A1 | 10/2002 | Matsumoto et al. |
| 2002/0152982 A1 | 10/2002 | Pietrowski et al. |

\* cited by examiner

INTAKE MANIFOLD WITH VARIABLE RUNNER AREA

RELATED APPLICATION

This application is a continuation in part application of U.S. patent application Ser. No. 10/496,602 filed May 25, 2004.

FIELD OF THE INVENTION

The invention relates to a tunable intake manifold for an internal combustion engine. More specifically, the invention relates to a tunable intake manifold having runners with adjustable cross-sectional areas.

DESCRIPTION OF THE RELATED ART

Air intake manifolds for internal combustion engines are used to transport and direct air and fuel to the cylinders of the internal combustion engine. The intake manifold receives the air from a plenum. Once the air leaves the plenum, the manifold directs the air to the individual cylinders where it is received and used in combustion.

The geometry of each of the runners in the intake manifold dictate how efficient the transportation of the air to the cylinders of the internal combustion engine is. The length and the cross-sectional area of the runners directly affect the pressure and velocity at which the air reaches the cylinders.

The design of the runner is typically made to optimize the performance of the internal combustion engine at a specific speed thereof. While optimization occurs at a specific speed, compromises in performance are made at every other speed in which the internal combustion engine operates. Therefore, there is a need to successfully control the pressure and velocity of the air as it passes through the runners of the intake manifold allowing optimization of the internal combustion engine performance at a plurality of speeds.

U.S. Pat. No. 4,210,107, issued to Shaffer on Jul. 1, 1980, discloses a tunable intake manifold. The intake manifold includes a plurality of intake runners, each having a side wall that is adjustable throughout the length of each of the intake runners. The adjustable side walls move transversely inwardly and outwardly with respect to the flow direction of the air throughout the intake runner to correspondingly decrease and increase the through flow cross-sectional area. While such an adjustable side wall may adjust the cross-sectional area of each of the runners, the side wall creates a space between the side wall and the side of the runner that the side wall has moved away from. This unused volume is not sealed and may receive portions of the air as it passes thereby, which will reduce the effectiveness of the device and create inefficiencies in the intake runners. In addition, these spaces may induce unwanted turbulence in the intake runners.

SUMMARY OF THE INVENTION

According to one aspect of the invention, a tunable intake manifold is provided for directing a flow of air between a plenum and an internal combustion engine. The tunable intake manifold includes a manifold housing defining an interior. The manifold housing has a plurality of runner walls extending through the interior. The tunable intake manifold also includes a slider having a plurality of slider walls extending through the interior of the manifold housing. The plurality of slider walls corresponds to the plurality of runner walls to define a plurality of runners. Each of the plurality of runners has a defined cross sectional area for transporting the flow of air therethrough. The slider is slidably engaged with the manifold housing for moving the plurality of slider walls relative to the plurality of runner walls to selectively change the defined cross sectional area of the plurality of runners, such that the volume of air passing therethrough changes with the movement of the slider.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENTS

Referring to FIGS. 1 through 4, a tunable intake manifold is generally indicated at 10. The tunable intake manifold 10 extends between a receiving end 12 and a transmitting end 14. The transmitting end 14 includes an end plate 15 that defines a plurality of ports 17 corresponding to the cross section of a fully open runner, discussed in greater detail subsequently. The tunable intake manifold 10 includes a manifold housing 16 that extends between the receiving end 12 and the transmitting end 14. The manifold housing 16 defines an interior 18 and a plurality of runner walls 20 extending through the interior 18.

The tunable intake manifold 10 receives air from a plenum 21 that is fixedly secured to the receiving end 12 of the tunable intake manifold 10. The plenum 21 includes an inner cavity 21a that is used as a reservoir for air. The plenum 21 also includes a plurality of outlets 23 adjacent the receiving end 12 of the housing 16 and each generally corresponding to each of the opposing plurality of ports 17. While it is contemplated that the tunable intake manifold 10 is used with an internal combustion engine that incorporates fuel injection, it should be appreciated by those skilled in the art that the plenum 21 may hold an air/fuel mixture should the internal combustion engine be fitted with a carburetor or central fuel injector to transmit fuel for combustion.

The air is transmitted through the tunable intake manifold 10 for subsequent combustion in an internal combustion engine operatively connected to the transmitting end 14 of the tunable intake manifold 10. It should be appreciated that while the tunable intake manifold 10 is configured to work in conjunction with an 14 internal combustion engine, the tunable intake manifold 10 may be designed to work cooperatively with any internal combustion engine configuration having any number of cylinders.

The tunable intake manifold 10 also includes a slider 22 that extends through the interior 18 of the manifold housing 16. The slider 22 slidingly engages the manifold housing 16 for transverse movement within the interior 18. The slider 22 includes a platform 24 that abuts against an interior surface 26 of the manifold housing 16. The interior surface 26 is longer than the platform 24 allowing the platform 24 to slide with respect to the interior surface 26.

Figure 1:
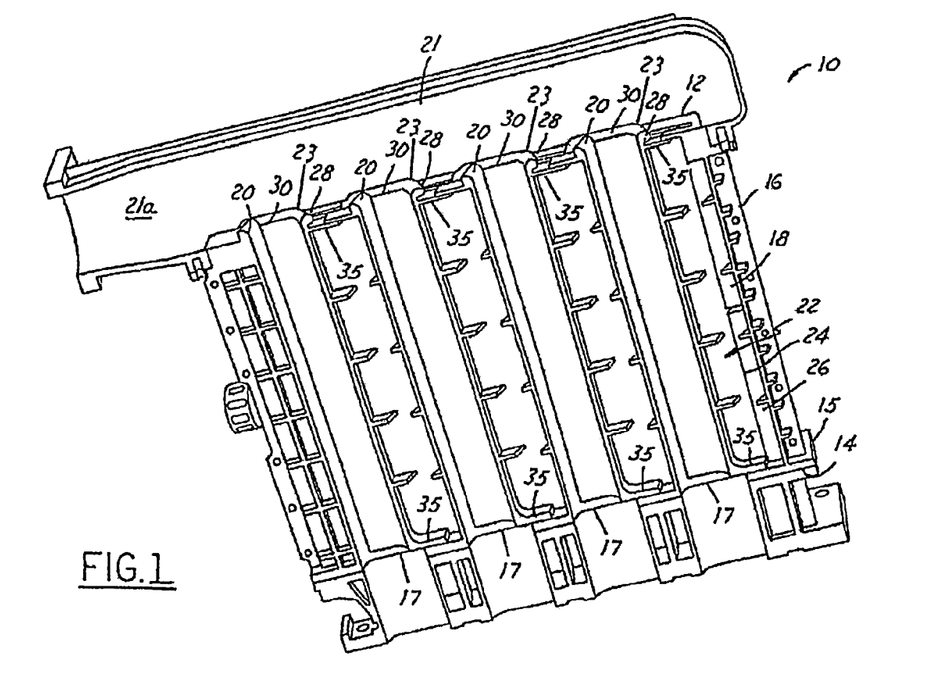
FIG. 1 is a cut-away perspective view of a plenum and tunable intake manifold incorporating one embodiment of the invention.
Figure 2:
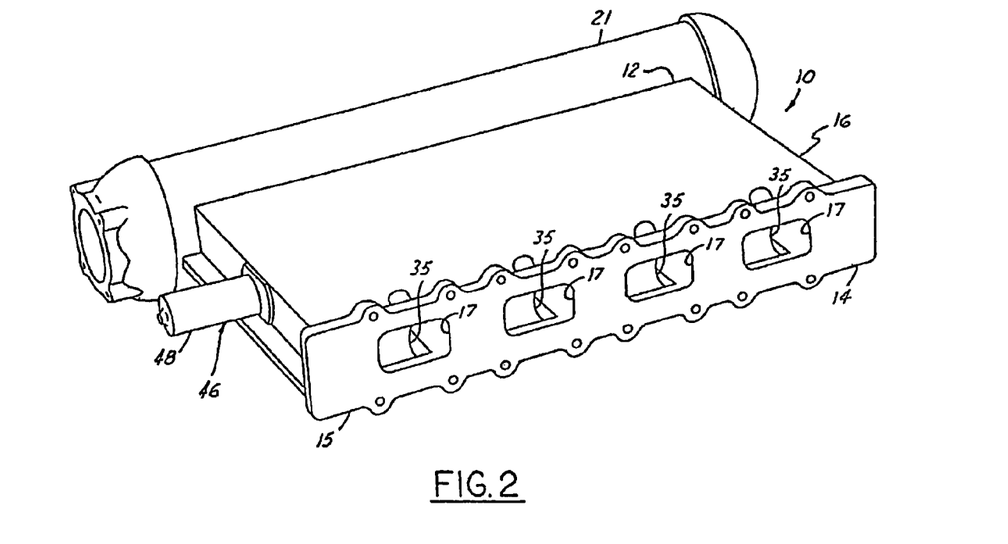
FIG. 2 is a perspective view of the plenum and intake manifold.
Figure 3:
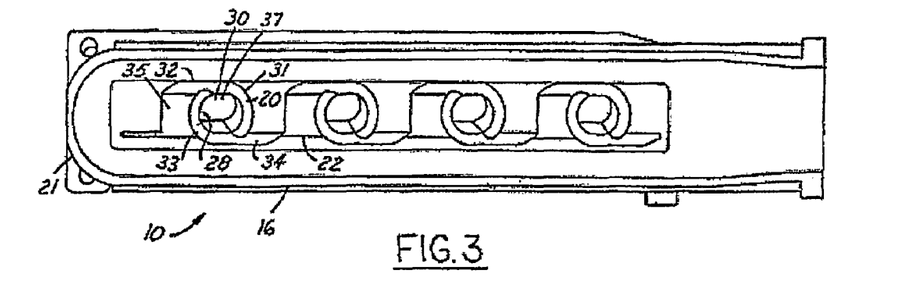
FIG. 3 is an end view of the intake manifold.

The slider 22 also includes a plurality of slider walls 28. Each of the plurality of slider walls 28 is paired with each of the plurality of runner walls 20. The plurality of runner 20 and slider walls 28 cooperate with each other to define a plurality of runners 30. The plurality of runners 30 extend between the respective plurality of ports 17 and plenum outlets 23. Each of the runners 30 defines a defined cross-sectional area and volume. It is through the runners 30 that the air is transported from the plenum 21 to the internal combustion engine. As best shown in FIG. 3, each of the plurality of runner walls 20 and plurality of slider walls 28 includes a curved end 31, 33. Each of the plurality of runner walls 20 and plurality of slider walls 28 includes a lateral surface 32, 34 that extends transversely from the curved end 31, 33. The curved ends 31, 33 of the plurality of runner walls 20 and slider walls 28 cooperate with the lateral surfaces 34, 32 of the plurality of slider walls 28 and runner walls 20, respectively, to define a plurality of openings 37 through which the flow of air enters each of the plurality of runners 30. The size of the plurality of openings 37 contracts and expands with corresponding transverse movement of the plurality of slider walls 28 relative to the plurality of runner walls 20. The curved ends 31, 33 and the lateral surfaces 32, 34 are lip-shaped to maximize the efficiency of the air passing therethrough by minimizing flow losses.

To ensure unwanted cavities are not created, the slider 22 includes a plurality of end walls 35 that extend generally perpendicularly between the platform 24 and each of the plurality of slider walls 28. The end walls 35 close each of the plurality of ports 17 and each of the plurality of outlets 23 as the slider 22 moves to reduce the volume of the runners 30. It should be appreciated by those skilled in the art that the slider 22 can be formed of a single piece or it can be formed from a plurality of pieces fixedly secured together.

Figure 4:
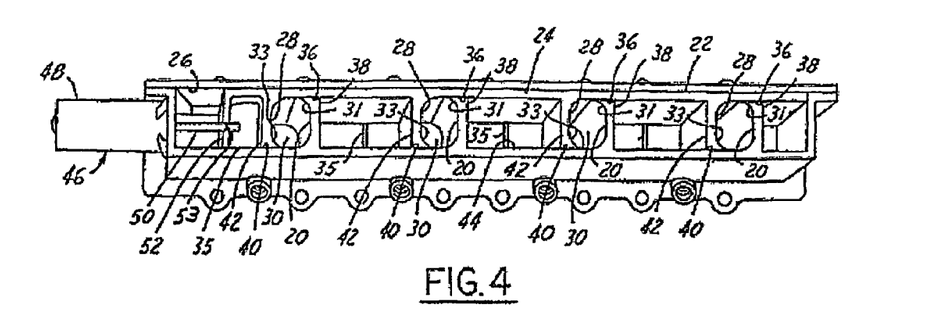
FIG. 4 is a cut-away perspective view of the intake manifold with a portion of a manifold housing removed therefrom.

As best shown in FIG. 4, a seal 36 extends along a runner distal end 38 for sealing the runner walls 20 against the platform 24 of the slider 22. Likewise, a seal 40 extends along a slider distal end 42 to seal each of the slider walls 28 against a second interior surface 44 of the manifold housing 16. Therefore, the runners 30 are sealed channels through which the air is transported from the plenum 21 to the internal combustion engine. Preferably, the seal 36, 40 is made from an elastomeric or polymeric material. The seal 36, 40 may be fixedly secured to the distal end 38, 42 by any suitable means, such as adhesives or interference fit. The seal 36, 40 may also be integrally formed onto the distal end 38, 42.

The tunable intake manifold 10 includes a drive assembly, generally shown at 46. The drive assembly 46 is fixedly secured to the manifold housing 16 and is operatively connected to the slider 22 to move the slider 22 transversely along the manifold housing 16 to change the defined cross section thereof. Changing the defined cross section of each of the plurality of runners 30 changes the volume of air passing therethrough. Because the slider 22 is infinitely adjustable along the interior surface of the manifold housing 16, an infinite number of adjustments may be made to the size of the runners 30 allowing optimization of volumetric efficiency in the transport of air to the internal combustion engine. This allows optimization over any speed at which the internal combustion engine is operating.

The drive assembly 46 includes an electronic actuator 48 and a drive screw 50. The drive screw 50 is a worm gear that rotates with respect to the slider 22.

In the preferred embodiment, the electronic actuator 48 is a motor that receives signals based on the speed of the internal combustion engine and rotates the drive screw 50 accordingly to move the slider 22 to the proper location to maximize the volumetric efficiency of the internal combustion engine. The drive screw 50 engages a driven wall 52 that extends out from the platform 24 of the slider 22 perpendicularly thereto. The driven wall 52 includes a threaded aperture 54. The drive screw 50 threadingly engages the threaded aperture 53, such that the slider 22 moves relative to the manifold housing 16 in response to rotation of the drive screw 50.

By restricting and expanding the volume of the runners 30 using the tunable intake manifold 10, the volumetric efficiency of the internal combustion engine may be maximized or controlled over the entire range of engine speeds. By adjusting the cross section of the plurality of runners 30 by movement of the slider 22 instead of varying the runner length, the tuneable intake manifold 10 of the invention improves over conventional adjustable manifolds by having no increased frictional losses due to increased wall length. The tunable intake manifold 10 is compact in size and simple in construction. Because the length of the runners 30 does not change, the tunable intake manifold 10 retains its compact size throughout its performance range. Further, the tunable intake manifold 10 can be used to maximize the beneficial effects of the reflected suction wave created by the drawing of the piston down into the cylinder of the internal combustion engine. The tunable intake manifold 10 also permits optimization of the velocity of the flow of air entering the internal combustion engine. By doing so, the inertial supercharging of the internal combustion engine can be enhanced.

Figure 5:
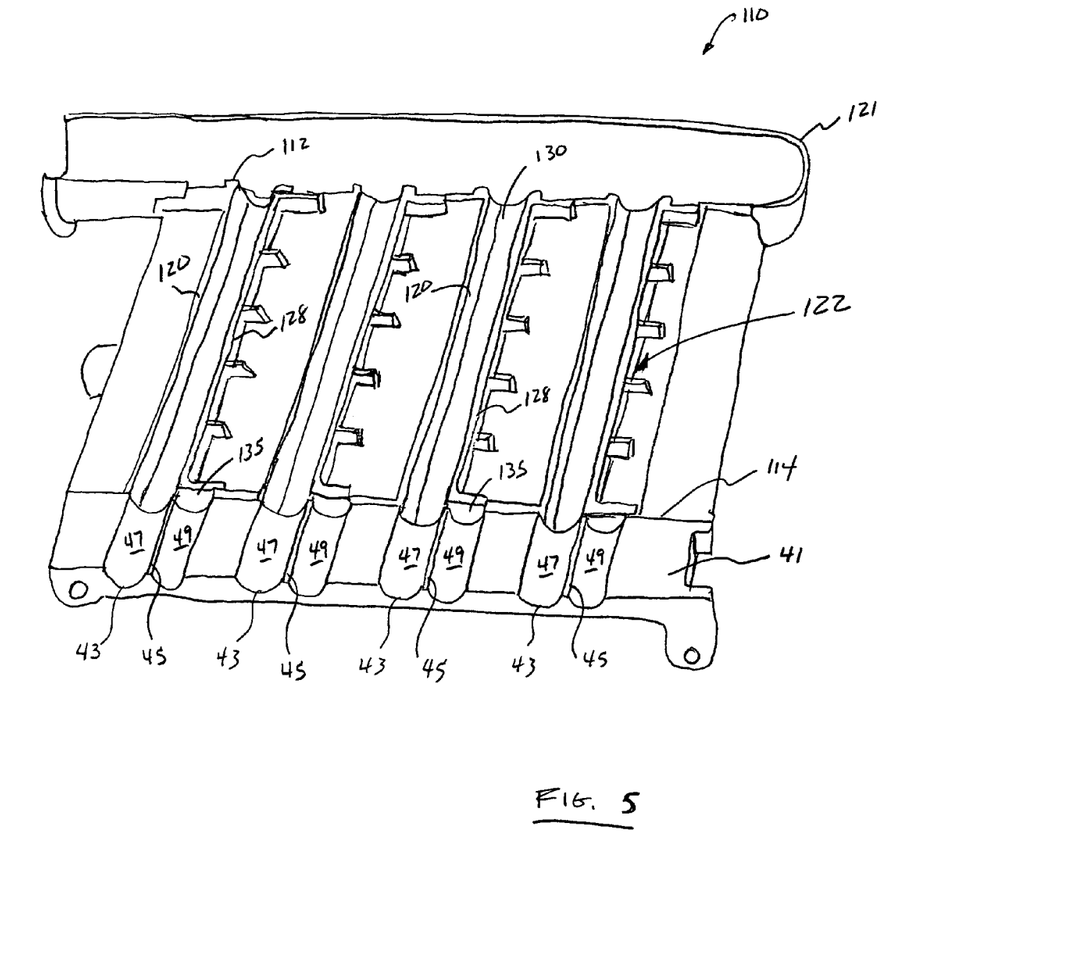
FIG. 5 is a cut away perspective view of the intake manifold according to a second embodiment of the invention.

Referring to FIG. 5, a second embodiment of the intake manifold is generally indicated at 110, wherein elements of the alternative embodiment similar to those in the first embodiment are indicated by reference characters that are offset by 100. The transmitting end 114 of the intake manifold 110 is defined by a secondary intake 41. The secondary intake 41 can be fixedly secured or integrally formed as part of either the intake manifold 110 or the engine. The secondary intake 41 includes a plurality of secondary runners 43, each of which correspond to each of the plurality of runners 130. A divider wall 45 divides each of the plurality of secondary runners 43 into first 47 and second 49 intake ports, each corresponding to an inlet port or valve (not shown) on the engine. Each of the slider walls 128 move with the slider 122 to selectively direct the flow of air through the first intake port 47 or through both the first 47 and second 49 intake ports. Each of the end walls 135 moves with the slider 122 to selectively limit or block the flow of air through the second 49 intake port, thus enabling the intake manifold 110 to function as a port de-activation device. In FIG. 5, the slider wall 128 is aligned longitudinally with the divider wall 45 and the end wall 135 is disposed over the second intake port 49, such that the flow of air is directed through only the first intake port 47. To increase the flow of air to the engine, each of the slider walls 128 is displaced outwardly with respect to each of the runner walls 120. The outward movement of the slider wall 128 relative to the runner wall 120 increases the volume of the respective runner 130. The slider wall 128 directs the flow of air through both the first 47 and second 49 intake ports.

Figure 6:
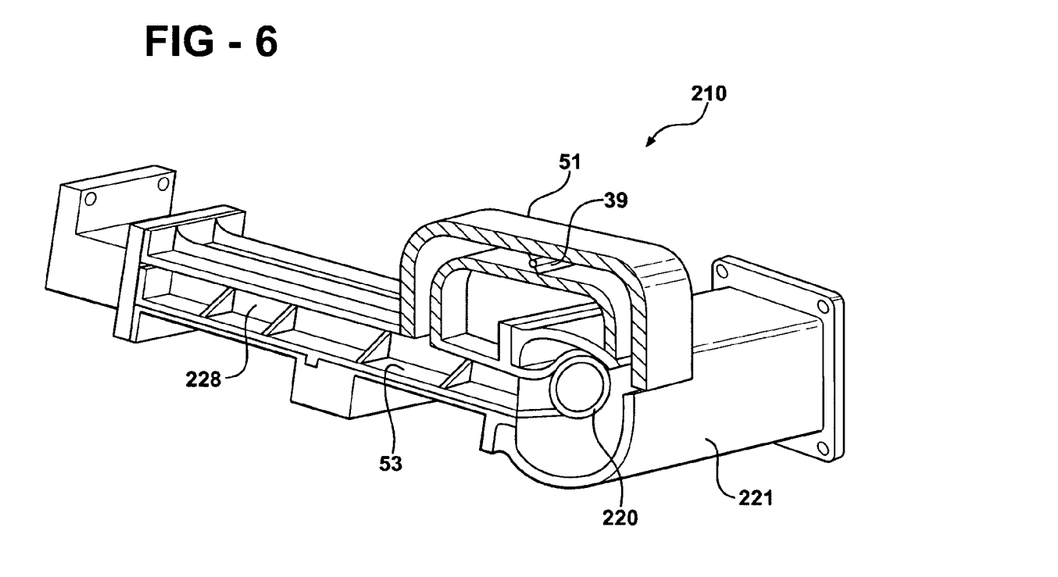
FIG. 6 is a perspective view of the intake manifold having a conduit according to a third embodiment of the invention.

Referring to FIG. 6, a third embodiment of the intake manifold is generally indicated at 210. The intake manifold 210 includes at least one conduit 51 that extends between the plenum 221 and at least one of the enclosed spaces 53 defined as the area between the back side of the slider wall 228 and adjacent runner wall 220 to increase the effective volume of the plenum 221. A valve 39 may be controlled by an actuator, such as a vacuum diaphragm, to open and close the passageway through the conduit 51 to control the increase in effective volume of the plenum 221 provided by the additional air from the spaces 53.

Figure 7:
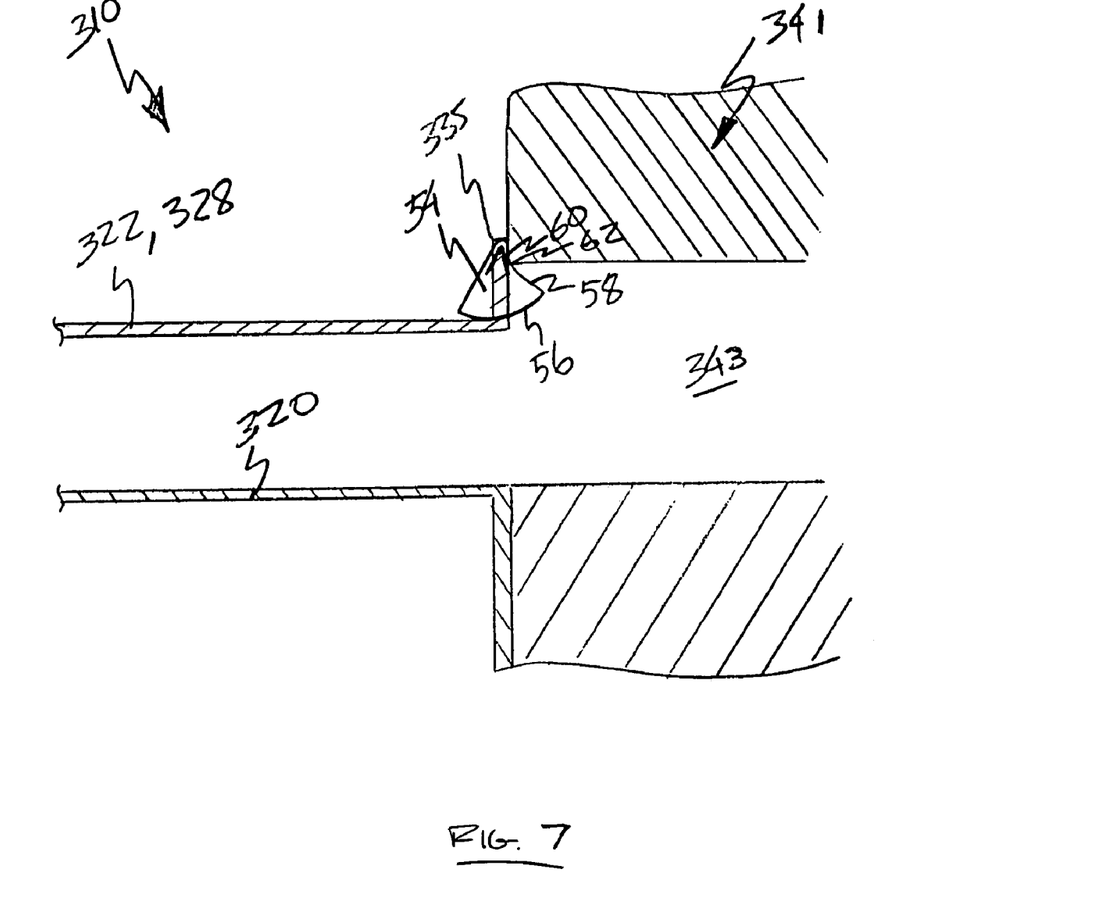
FIG. 7 is a cross sectional view of the intake manifold having a diffuser member according to a fourth embodiment of the invention.

Referring to FIG. 7, a fourth embodiment of the intake manifold is generally indicated at 310. A diffuser member 54 is pivotally assembled to each end wall 335 of each slider 322. The diffuser member 54 has an arcuate diffusing surface 56 and an opposite cam surface 58. Each diffuser member 54 fills a corner space defined by the intersection of each of the end walls 335 and the inner walls defining each of the secondary runners 343. A biasing member 60 pivotally continuously biases the diffuser member 54 in a counter-clockwise direction, as viewed in FIG. 7, toward the corner space. The cam surface 58 remains engaged with a surface or edge 62 defined by the secondary intake 341 during movement of each of the slider 322. The diffusing surface 56 minimizes vortexes that are created by the flow of air adjacent the corner space by providing a smoother transition between each end wall 335 and each inner wall of each secondary runner 343. The cam surface 58 overcomes the force of the biasing member 60 and displaces the diffuser member 54 in a clockwise direction out of the corner space in response to movement of the slider wall 328 away from the runner wall 320.

Figure 8:
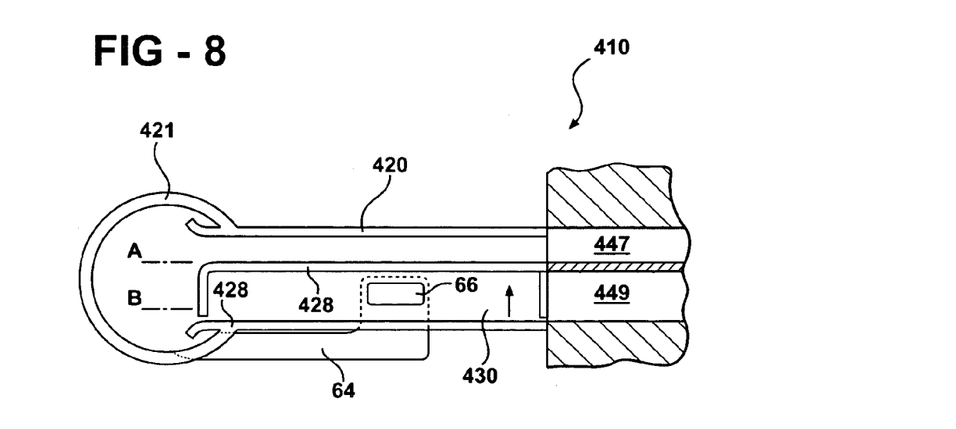
FIG. 8 is a cross sectional view of the intake manifold having a passageway according to a fifth embodiment of the invention.

Referring to FIG. 8, a fifth embodiment of the intake manifold is generally indicated at 410. A passageway 64 extends between the plenum 421 and an aperture 66 formed at an intermediate portion of the runner 430. The slider wall 428 is movable between a first position, indicated at A, and a second position, indicated at B. In the first position A, the slider wall 428 conceals the aperture 66 and directs the flow of air through the first intake port 447. In the second position B, the slider wall 428 is further spaced apart from the runner wall 420 than in the first position A to allow the flow of air through both the first 447 and second 449 intake ports. In the second position B, the aperture 66 is exposed to allow the flow of air through the passageway 64 and the volume of the runner 430 is increased, which results in a shorter effective runner length relative to the first position A.

Figure 9A:
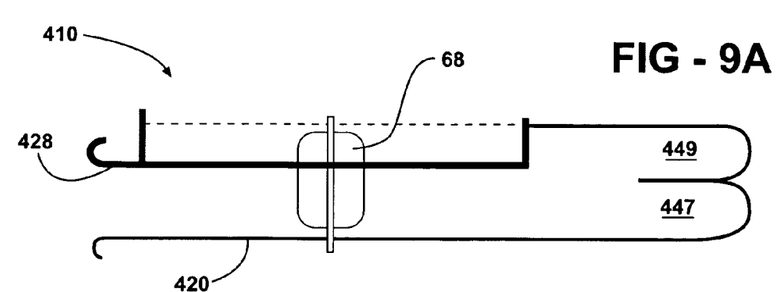
FIG. 9 is a cross sectional top view of the intake manifold having valves according to an alternative embodiment of the invention.
Figure 9B:
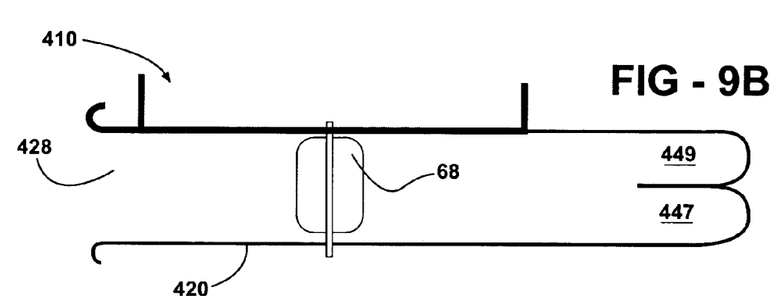
Figure 10A:
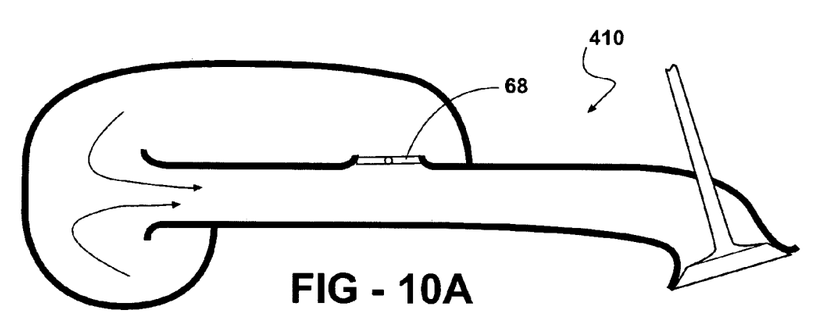
FIG. 10 is a cross sectional side view of the intake manifold having valves according to an alternative embodiment of the invention.
Figure 10B:
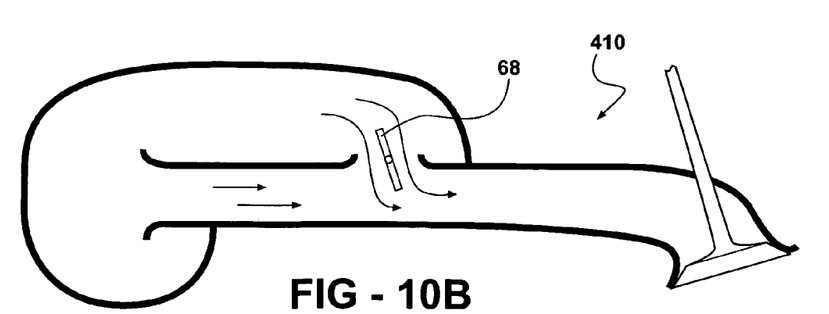

Alternatively, a valve 68 is operatively coupled between the passageway 64 and the runner 430 for controlling the flow of air therebetween, as shown in FIGS. 9 and 10. More specifically, the valve 68 is movable between a closed position, as shown in position A in FIGS. 9 and 10, and an open position, as shown in position B in FIGS. 9 and 10. In the closed position, the valve 68 prevents the flow of air through the passageway 64, such that the air flows only through the runner 430. Preferably, the slider wall 428 directs the flow of air through only first intake port 447, while the valve 68 is closed. In the open position, the valve 68 allows the flow of air therethrough, which shortens the effective length of the runner 430. Preferably, the slider wall 428 is displaced transversely away from the runner wall 420 when the valve 68 is opened to increase the volume of the runner 430 and allow the flow of air through both the first 447 and second 449 intake ports.

Figure 11:
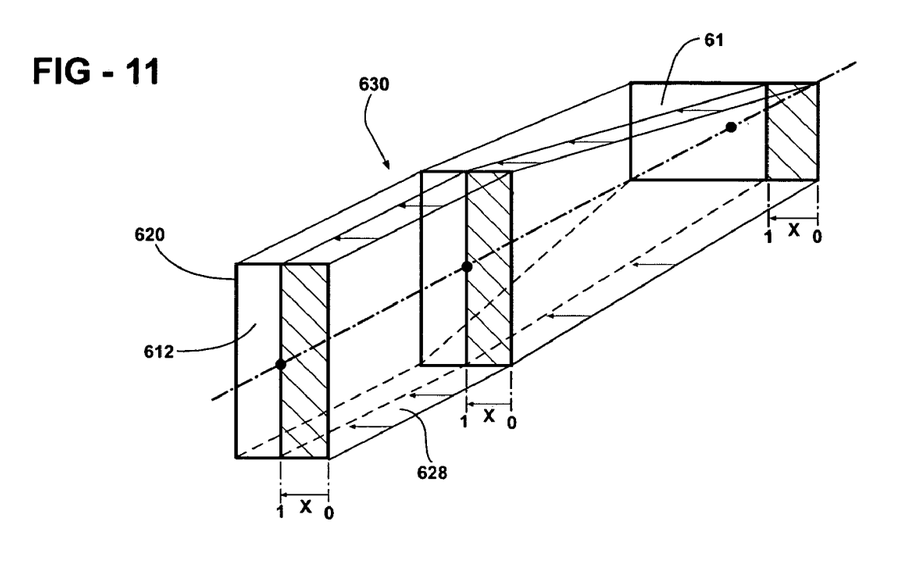
FIG. 11 is a perspective view of a runner according to a sixth embodiment of the invention.

A sixth embodiment of the intake manifold is shown in FIG. 11, wherein the runner 630 has a cross sectional area that varies along the length of the runner 630 in response to movement of the slider wall 628 with respect to the runner wall 620. For example, the cross section of the runner 630 at the receiving end 612 can be smaller than at the transmitting end 614, such that the percent change in cross sectional area is greater at the receiving end 612 than at the transmitting end 614 during transverse displacement of the slider wall 628 relative to the runner wall 620.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A tunable intake manifold for directing a flow of air between a plenum and an internal combustion engine, said tunable intake manifold comprising:
   a manifold housing defining an interior, said manifold housing having a runner wall extending through said interior between an opening and an opposite intake port;
   a slider having a slider wall extending through said interior of said manifold housing, said slider wall cooperates with said runner wall to define a runner having a defined cross sectional area for transporting the flow of air therethrough, said slider slidably engaged with said manifold housing for moving said slider wall relative to said runner wall to selectively change said defined cross sectional area of said runner, such that the volume of air passing therethrough changes with said movement of said slider; and
   a diffuser member pivotally coupled to said slider adjacent said intake port, said diffuser member including a cam surface in continuous contact with said manifold housing for pivoting said diffuser member in response to movement of said slider wall relative to said runner wall and a diffusing surface variably extending from said slider wall into said intake port in response to said pivotal movement of said diffuser member to smooth the flow of air from said runner through said intake port.

2. A tunable intake manifold as set forth in claim 1 further including a biasing member coupled between said diffuser member and said slider for continuously biasing said cam surface against said manifold housing during movement of said slider wall.

3. A tunable intake manifold as set forth in claim 2 including a drive assembly operatively connected between said manifold housing and said slider to move said slider relative to said manifold housing to change said defined cross sectional area of each of said plurality of runners such that the volume of air passing therethrough changes with said movement of said slider.

4. A tunable intake manifold as set forth in claim 3, wherein said slider includes a platform slidably engaged with said manifold housing for movement of said slider relative to said manifold housing.

5. A tunable intake manifold as set forth in claim 4, wherein said plurality of slider walls extends outwardly from said platform for movement therewith relative to said plurality of runner walls to selectively change said defined cross sectional area of said plurality of runners such that the volume of air passing therethrough changes with said movement of said slider.

6. A tunable intake manifold as set forth in claim 5, wherein each of said plurality of slider walls includes a curved end and a lateral surface extending transversely from said curved end.

7. A tunable intake manifold as set forth in claim 6, wherein each of said plurality of runner walls includes a curved end and a lateral surface extending transversely from said curved end.

8. A tunable intake manifold as set forth in claim 7, wherein said curved ends of said plurality of runner walls and said plurality of slider walls cooperate with said lateral surfaces of said plurality of slider walls and said plurality of runner walls, respectively, to define an opening for receiving the flow of air therethrough.

9. A tunable intake manifold as set forth in claim 8, wherein said curved and lateral surfaces are lipped to minimize flow losses due to the flow of air passing through said opening.

10. A tunable intake manifold as set forth in claim 9 extending between a receiving end and a transmitting end, wherein said transmitting end includes an end plate having a plurality of ports each corresponding to said plurality of runners for receiving the flow of air therefrom.

11. A tunable intake manifold as set forth in claim 10, wherein said slider includes a plurality of end walls each extending outwardly from each of said plurality of slider walls and said platform to minimize cavities created due to said movement of said plurality of slider walls relative to said plurality of runner walls.

12. A tunable intake manifold as set forth in claim 11 including a plurality of seals each disposed between said plurality of runner walls and said platform and between said plurality of slider walls and said manifold housing for preventing the flow of air from leaking from each of said plurality of runners.

13. A tunable intake manifold as set forth in claim 12, wherein said drive assembly includes a drive screw threadingly engaged with said slider to cause said movement of said slider with respect to said manifold housing in response to rotation of said drive screw.

14. A tunable intake manifold as set forth in claim 13, wherein said drive assembly includes a motor for rotatably driving said drive screw to cause said movement of said slider with respect to said manifold housing in response to rotation of said drive screw.

15. A tunable intake manifold as set forth in claim 1, wherein said cross sectional area of said runner varies along the length of said runner in response to movement of said slider wall relative to said runner wall.

* * * * *